Feb. 16, 1926.

E. BATTEN ET AL 1,573,534

MANUFACTURE OF INLAID FLOORCLOTHS

Filed Oct. 6, 1924    5 Sheets-Sheet 1

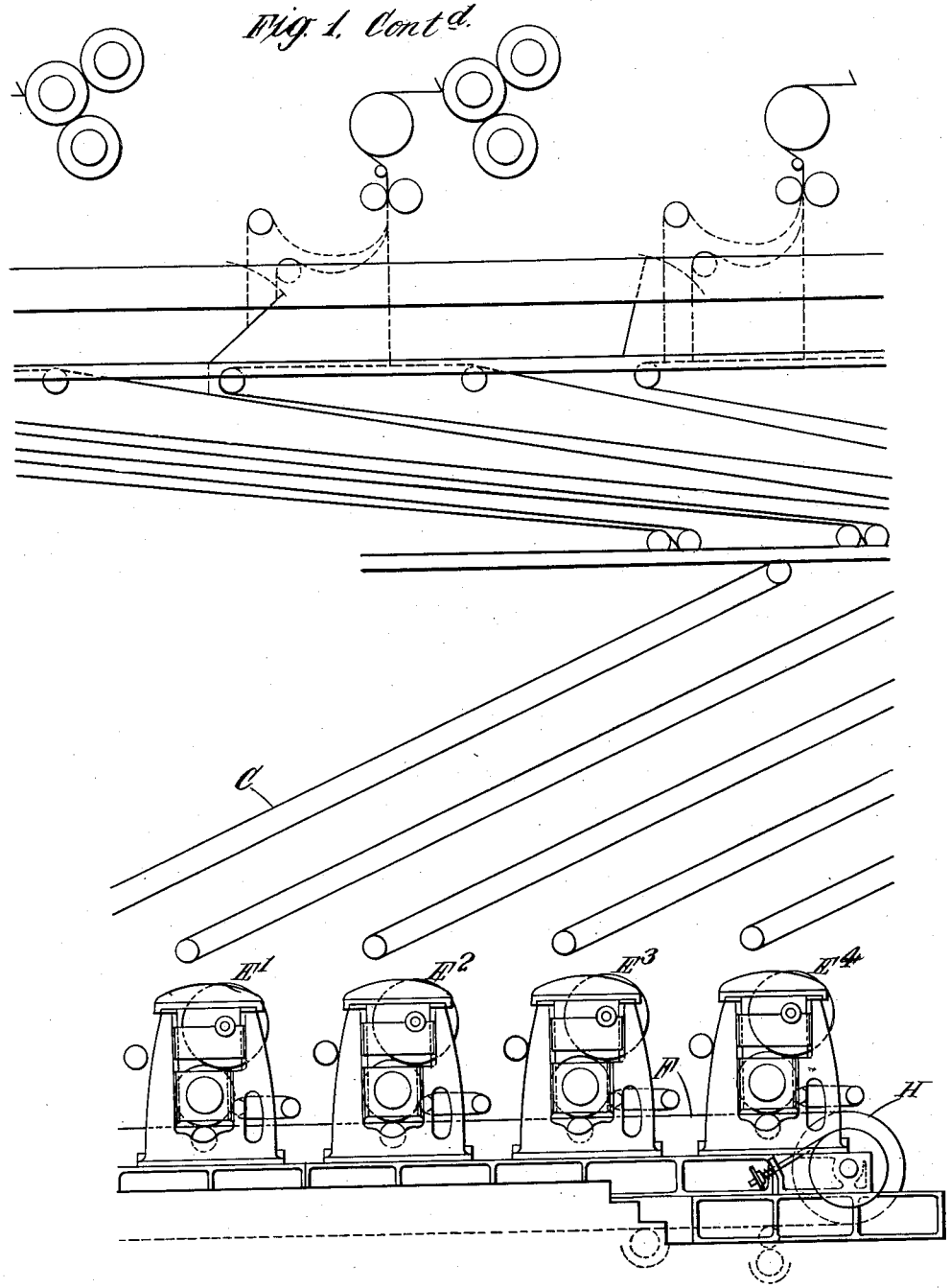

Feb. 16, 1926.

E. BATTEN ET AL 1,573,534

MANUFACTURE OF INLAID FLOORCLOTHS

Filed Oct. 6, 1924   5 Sheets-Sheet 3

Inventors
Edward Batten
James Denne Batten

By Pennie, Davis, Marvin & Edmonds
Attorneys

Feb. 16, 1926. 1,573,534
E. BATTEN ET AL
MANUFACTURE OF INLAID FLOORCLOTHS
Filed Oct. 6, 1924 5 Sheets-Sheet 4
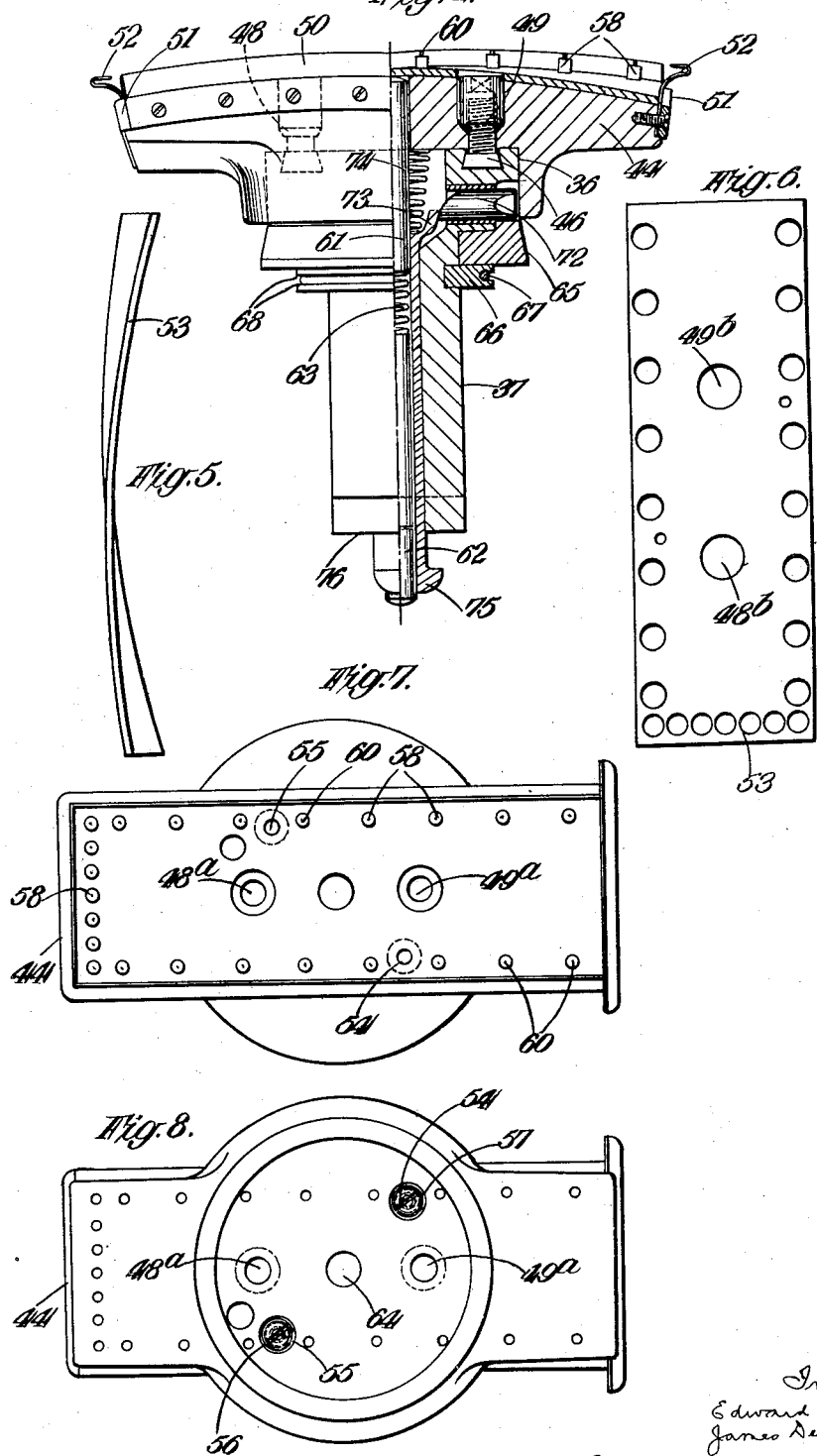

Feb. 16, 1926. 1,573,534
E. BATTEN ET AL
MANUFACTURE OF INLAID FLOORCLOTHS
Filed Oct. 6, 1924 5 Sheets-Sheet 5
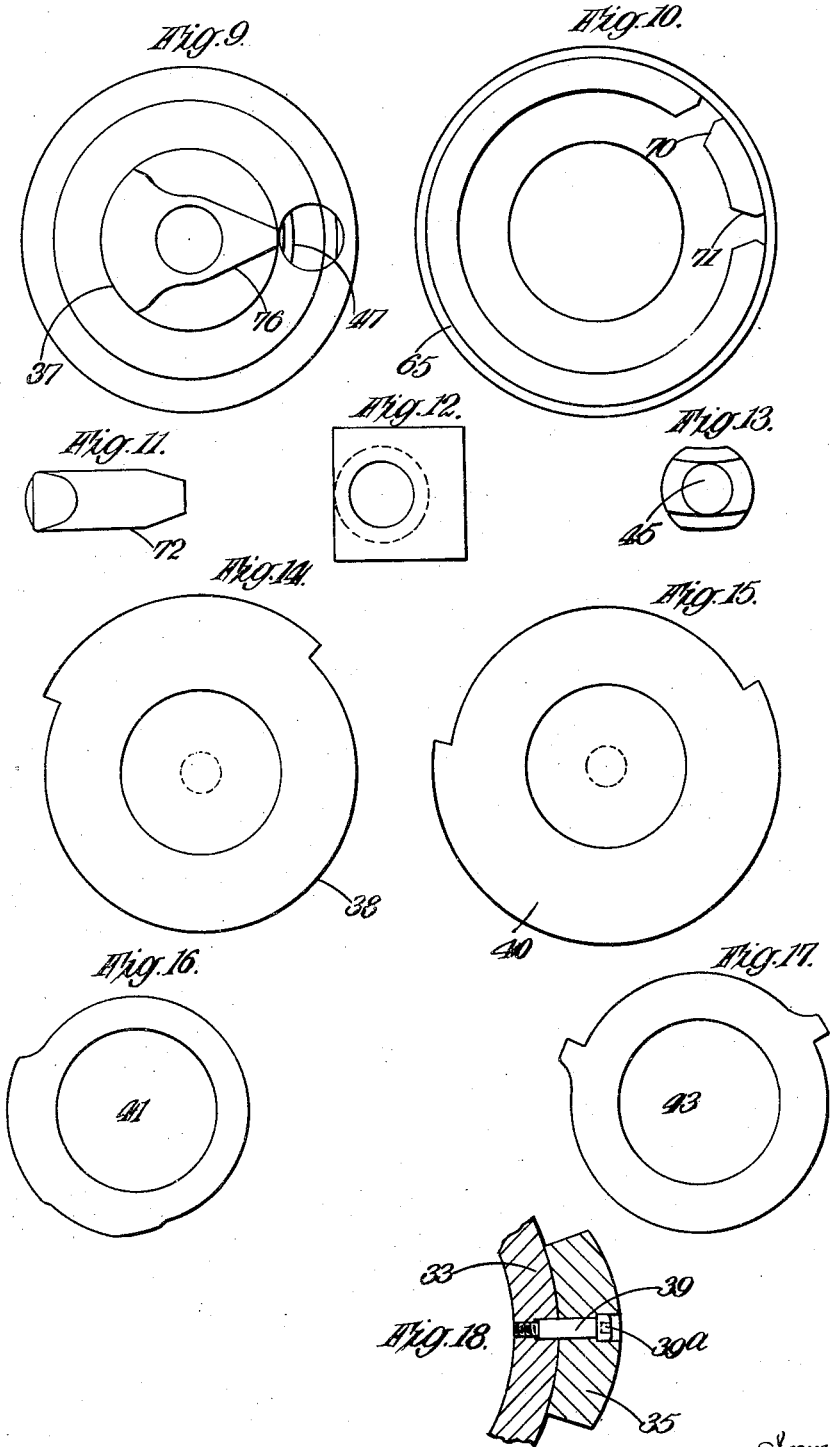

Patented Feb. 16, 1926.

1,573,534

UNITED STATES PATENT OFFICE.

EDWARD BATTEN AND JAMES DENNE BATTEN, OF BECKENHAM, ENGLAND.

MANUFACTURE OF INLAID FLOORCLOTHS.

Application filed October 6, 1924. Serial No. 741,932.

*To all whom it may concern:*

Be it known that we, EDWARD BATTEN and JAMES DENNE BATTEN, both subjects of the King of Great Britain, residing, respectively, at 22 Westfield Road, Beckenham, in the county of Kent, England, and 102 Beckenham Road, Beckenham, in the county of Kent, England, have invented certain new and useful Improvements in or Relating to the Manufacture of Inlaid Floorcloths, of which the following is a specification.

This invention relates to the manufacture of inlaid floor cloths by the method in which sheets of plastic material of different colours are taken from continuously rotating calender rolls to continuously rotating cutting cylinders, the knives on the latter cutting from the travelling material pieces of the required shapes and sizes, these pieces being then continuously assembled upon a travelling canvas or other suitable backing, and thereafter consolidated by heat and continuous rotary pressure into a homogeneous floor covering displaying a pattern made up of the diverse colours delivered by the respective calender rolls.

In continuous rotary machinery for this purpose as heretofore made, the direction in which the sheet material progresses through the whole system is incapable of change, being always at right angles to the common axial alignment of all the rotating members by which its position is controlled.

It is however frequently desirable in the manufacture of parquet or figured linoleum, wherein the patterns are wholly or partially composed of elements which are not self coloured, but have variegated colours within the bounds of one pattern element, being for example grained like wood or variegated in colour to represent marble or granite, that the direction of the streaks of variegated colours in the pattern elements should in the finished floor covering coincide with a dimension of the pattern element which is not at right angles to the common axial alignment, whereas in the sheets of material delivered by the calender rolls. the graining of the sheet or the direction of the vein of colour is substantially at right angles to the common axial alignment of the system.

Furthermore in such continuous rotary machinery as heretofore used, as only one finished floor covering is continuously produced, whatever be the number of colours from which it is assembled, it has been necessary to return to the calender rolls a total quantity of material remaining in the sheets equal in volume to one sheet less than the number of sheets being used to produce the required pattern, and the sheet material so returned after being mixed with the required amount of new material is again incorporated in a sheet of the colour from which the required shapes for the pattern being produced have been cut, and again fed to the cutting cylinders. This condition has also operated to prevent the use of continuous rotary machinery in the production of patterns consisting of pattern elements of variegated colour within the content of the same element because the grained or marbled appearance of the sheet as originally fed to the cutting cylinders could not be maintained in subsequent use of the same material when again fed to the calender rolls and made into sheets for the cutting cylinders.

The principal objects of this invention are to enable patterns in imitation of inlaid wood or parquetry, and of marble or other variegated titles, to be produced continuously by rotary machinery with the grain running in any desired direction, and to reduce the volume of scrap material returned to the calenders.

According to this invention pattern elements after being cut from the travelling sheet or strip of material are turned automatically through a suitable angle so that when assembled on the backing they lie with the grain in a direction other than longitudinally of the floor cloth being made. The automatic turning means comprise cutting dies having stems placed radially in relation to the axis of a rotary cylinder, which dies are each partially rotated after cutting out a pattern element and before depositing the said pattern element on the backing, and the said rotary movement of the die is then reversed in readiness for the next cutting operation. The sheet of material coming from the calender rolls is cut into relatively narrow ribbons or planks, and the surface speed of the calender is reduced to supply little more than the quantity of material required for the pattern elements, the quantity of material returned to the calenders being therefore greatly reduced. The feeding of the ribbon of material to each circumferential row of dies is effected by an oscillating inclined shoot or trough provided with a brake which is intermittently released. The invention also comprises pneumatic means for giving an additional pressure to the finished cloth.

In order that the said invention may be clearly understood and readily carried into effect, the same will now be described more fully with reference to the accompanying drawings or diagrams in which:—

Figure 1 is a diagram representing an example of the general arrangement of apparatus according to this invention, comprising a sequence of six unit machines for the manufacture of a floor cloth in which six or any other convenient number of different kinds or colours of pattern elements may be inlaid, one or some or all of these kinds or colours of pattern elements being laid in a direction other than that in which the material thereof emerged from the calender rolls.

Figure 4 is an elevation, half in section, of the die head assembled.

Figure 5 is a side elevation and Figure 6 a plan of the ejector plate detached from the die.

Figure 7 is a plan of the die from which the ejector plate has been removed.

Figure 8 is a back view of the die.

Figure 9 is an inverted plan of the die stem.

Figure 10 is a plan of the detent ring.

Figure 11 is a plan of the detent pin.

Figure 12 is a plan of the detent tappet.

Figure 13 is a plan of one of the bolts for securing the die to the die head.

Figures 14 to 17 are details of cams in the die cylinder.

Figure 18 is a side elevation partly in section of a cutter block, and a portion of the cutter cylinder.

Figure 1:
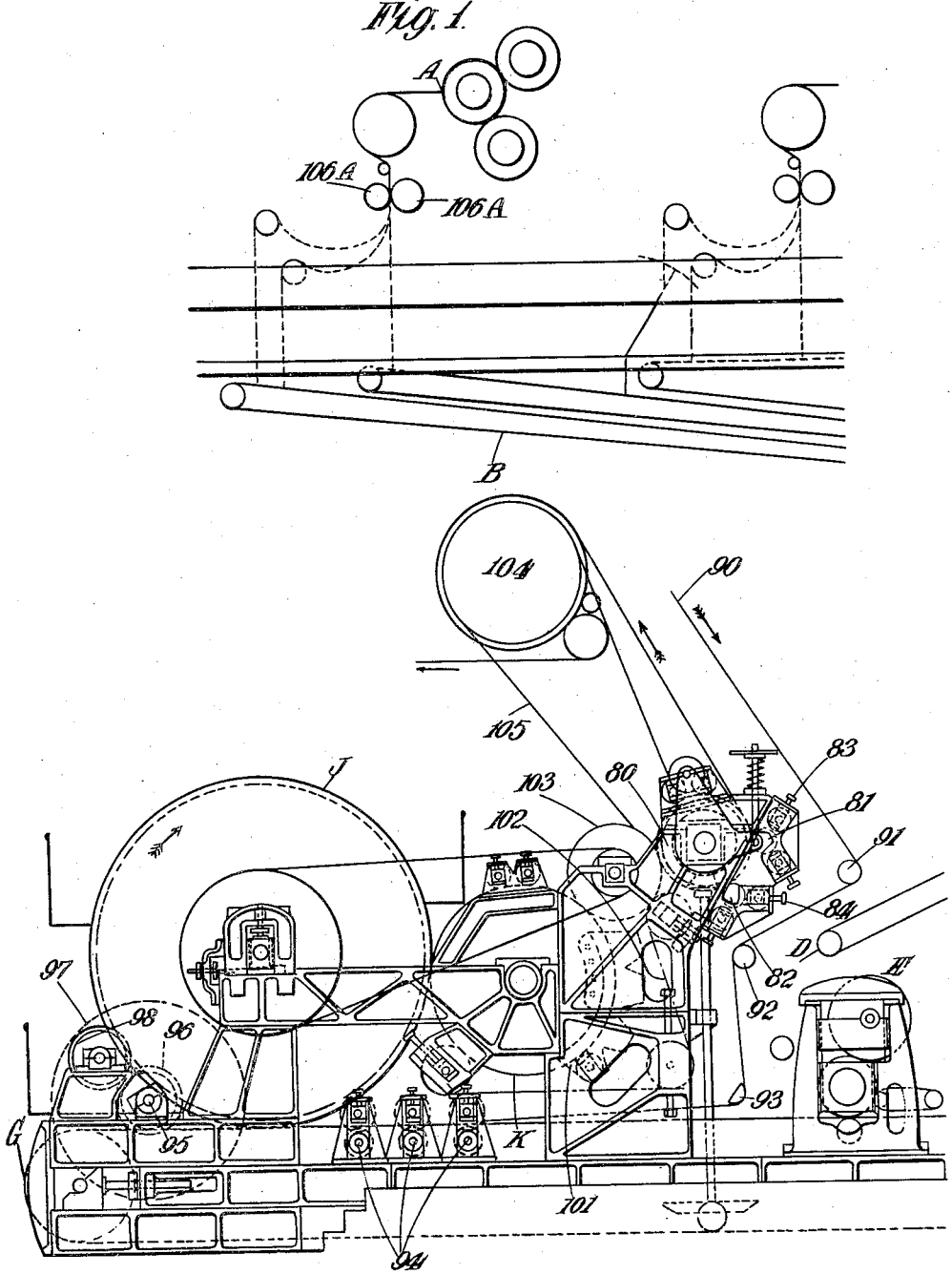

A, Figure 1, indicates diagrammatically a set of calender rollers, which will not be further described, as they are arranged and operate in the usual or any other suitable manner, and any required number of such sets may be employed, which may or may not correspond with the number of inlaying units, some similar sets being represented in the drawing in parallel with that illustrated at A. Sheets or ribbons of plastic material are in known manner brought from the calender rollers by endless conveyors B, C and pass over rollers D (Figures 1 and 2) to each unit pattern cutting and inlaying machine E, E$^1$, E$^2$, E$^3$, E$^4$, E$^5$, from which machines the pattern elements are successively delivered to the conveyor or assembling table F, which is an endless conveyor travelling around the rollers G, H. The canvas or other backing 90 enters the machine by way of the guide rollers 91 and 92 and passes over the "spreader" 93 to pairs of rollers 94, one of each pair being above the backing and the other below the assembling table or conveyor, and thence the backing with the elements in position passes round the large drum J for inspection. The surface of the drum J is provided with a large number of small pin points (not shown) which pierce the canvas backing and enter the pattern elements, thus picking up the pattern elements off the assembling table and holding them in position on the backing while passing around the drum J. The provision of a large number of points for picking up or retaining in position cut pattern elements is well-known in the art, being usually employed for like purposes in the manufacture of inlaid linoleum. The endless conveyor F may be caused to travel by any suitable means, a variety of such means being well known for actuating conveyors; for example we may employ a pair of wheels on the main driving shaft 95 engaging with linked racks at each side of the conveyor, which racks are so constructed as to pass around the rollers G, H. Also on this shaft 95 is one (96) of a pair of change wheels 96, 97 on the stud of the latter of which is a permanent wheel 98 driving the drum J, from which the travelling sheet passes round the hot pressing roller K, and between this roller K and one or more adjustable pressure rollers 101. A rubber jacket 102 is as usual interposed between the pressing rollers 101 and the cloth which is thus consolidated by heat and pressure. Thence the cloth passes over the roller 103, and then the cloth may be further pressed against a supplementary roller 80 as hereinafter described. The cloth then passes out of the machine to a cooling roller 104 driven by ropes 105.

Instead of all the sets of calender rollers being driven at the same speed, we drive them by any appropriate means, such as change gears or pulleys transmitting the power from a common driving shaft, or by separate electric motors, at such speeds as will in the case of each set supply little more than the quantity of material required to be used in the pattern elements, that is, the ribbons of any one kind of pattern material may arrive at the cutting dies at a speed much less than that at which the assembling table moves, so that the pattern elements will be cut out from the ribbon fairly close to each other, although they may be widely spaced apart in the finished cloth, whereby the proportion of waste is greatly reduced.

Figure 2:
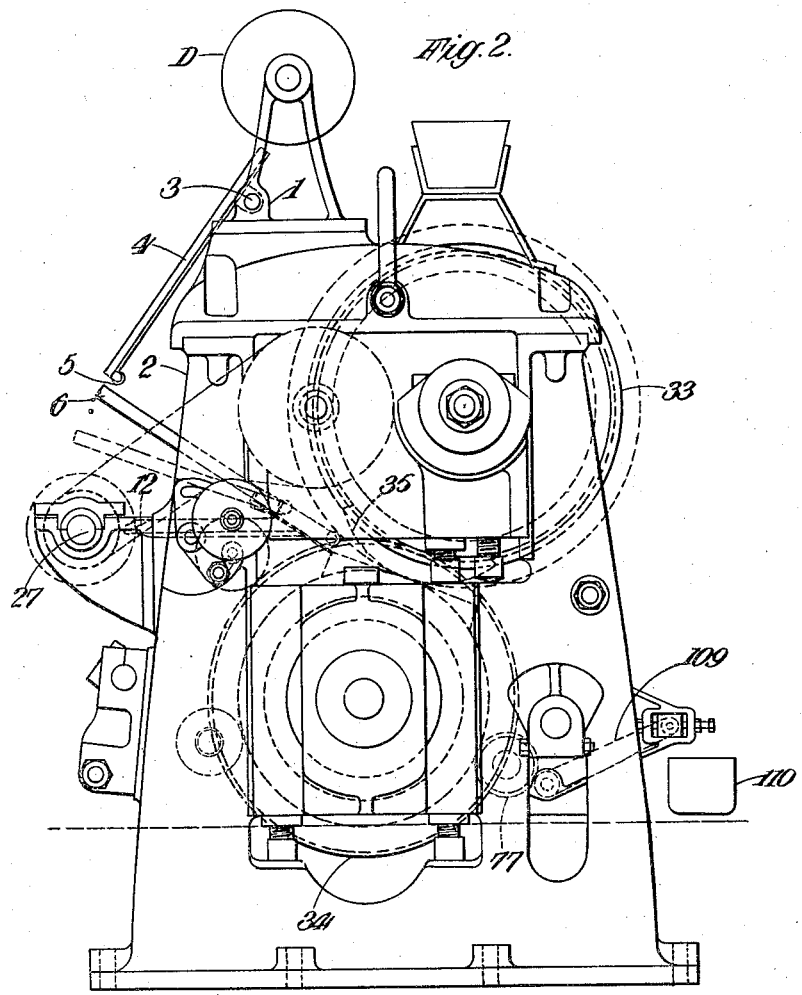
Figure 2 represents in side elevation one of the said units or colour system machines.
Figure 3:
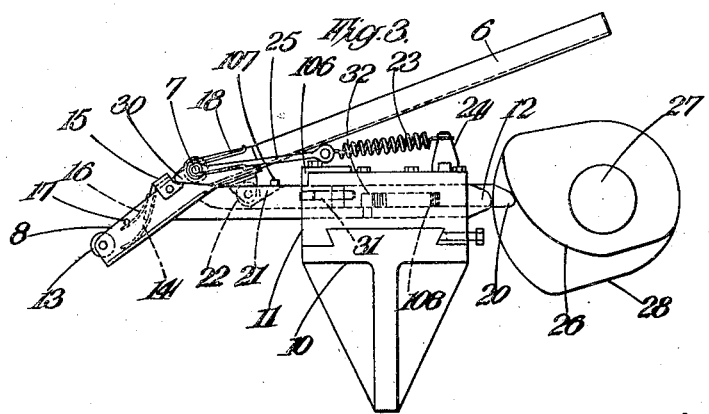
Figure 3 is a detail of the ribbon feeding mechanism.

In each of the said unit machines the sheet material, which after leaving the calender rollers has been cut into a number of parallel ribbons by slitting rollers 106$^A$, these ribbons being opened or spaced out by any suitable means, passes over the roller D to enter the machine. Mounted in a bracket 1 on the frame 2 of the machine is a rod or shaft 3 on which are pivoted a number of inclined troughs 4 (Figure 2) each trough being intended to accommodate and guide one ribbon, and being provided at its foot with a small roller 5 to prevent tearing of the ribbon. In the bracket 1 are springs (not shown) which tend to keep the troughs 4 in the inclined position shown. From the roller 5, each ribbon passes to an oscillatory feeding shoot 6 (Figures 2 and 3). This feeding shoot is intended to supply the dies with ribbon in such quantitites as to ensure that the pattern pieces shall be cut to the correct shapes, without an undue proportion of waste material being produced. The feeding shoots thus constitute intermediaries between the uniformly rotating calenders and the dies, which latter make an intermittent demand for ribbon. The shoot 6 in the lower position is at the angle of repose of the ribbon, and in its lifted position facilitates the descent of the ribbon. This shoot enters and is hinged by a pin at 7 to a shorter shoot 8 set at a constant angle and provided with a brake. A rigid bed 10 fixed across the framework of the machine carries a guide bracket 11 in which works a horizontal sliding bar 12 secured to the short shoot 8. The shoot 8 has a roller 13 at its delivery end, and a brake 14 attached to a brake rocker 15 at its other end; the brake 14 has a spring tail-piece 16 engaging a cross pin 17 which tends to keep the brake down on the ribbon at the bottom of the shoot. On the hinge pin 7 a spring 18 is provided which tends to keep the shoot 6 in its lowest position. The sliding bar 12 is channelled longitudinally and in the channel thereof works another sliding bar 20, the operative end of which 21 presents an inclined upper surface to the roller 22 carried on the underside of the shoot 6. A spring 23 anchored to a pillar 24 on the bracket 11 is connected by a link 25 to the hinge pin 7, and tends to draw back both the shoots 6 and 8. The bar 20 is in contact with a cam 26 on a rotary shaft 27 of the machine, and on the same shaft 27 are a pair of identically shaped cams, one of which is shown at 28, these latter cams engaging the ends of the two walls of the channelled bar 12. The nose 30 of the shoot 6 is in contact with the brake rocker 15. At the moment when the rearmost knife of a die has cut the ribbon, the shoot 6 has been pressed down by the spring 18, and the bars 12 and 20 have been drawn back by the action of the spring 23, the brake 14 being applied to keep the ribbon in tension while the die knife cuts. Then as the cams 26 and 28 rotate, the whole of the feeder mechanism advances towards the die, extending the spring 23 while the brake 14 remains on, thus presenting a slight excess of material to the die, the amount thus presented being controlled by the adjustment of a stop plate 106 on the bracket 11, this stop plate having a down-turned front wall adapted to engage a stop pin 107 on the bar 12, this stop pin being duplicated at the other side of the bar 12. This stop plate limits, according to its adjustment, the outward stroke of the bar 12, that is, the extent to which it can follow the cam. As soon as the die knife begins to cut, the bar 20 acting as a wedge against the roller 22 turns the shoot 6 upwards about the hinge 7 to the position shown in Figure 2, the nose 30 of the said shoot actuating the rocker 15 to release the brake 14, when the ribbon passes freely under the roller 13 to the die. Before the die is completely filled, the return motion of the shoots 6 and 8 is finished, and the brake 14 is again applied as soon as cutting is completed. The constant arrival of the ribbon from the calenders causes the ribbon to accumulate in a small loop on the shoot 6 in the interval between the filling of the dies. To alter the angle of inclination of the shoot 6 without altering the extent of its angular movement, the point in the stroke of the bar 20 at which the wedge 21 engages the roller 22 may be adjusted by the following means: The bar 20 is made in two pieces, connected together by a screw 31, so that by removing the bar and rotating one part of it to lengthen or shorten the extent to which the screw enters the other part, the effective length of the bar 20 beyond the stop piece 32 in the bar 12 can be adjusted. A spring 108 confined in a gap or recess in the bar 20 tends to keep it in contact with the cam 26.

The cutting out of the pattern elements is effected by the co-operation of two rotary cylinders 33 and 34, (Figure 2) geared to rotate together, that is, to complete each revolution simultaneously. The cylinder 33 which carries a number of cutter blocks 35 may be termed the cutter cylinder, and the cylinder 34 which carries a number of rotatable die heads 36 (Figure 4) may be termed the die cylinder. The cutter block and die indicated in Figure 2 are for a 90° oscillation, but the ejector plate shown in Figures 4 and 5 and the cam at the end of the die stem shown in Figure 9 are designed for a 45 degrees oscillation. The surface speed of the cutter block must be greater than that of the die knife. Therefore the cutter cylinder is shown of greater diameter than the die cylinder, and the surface of each cutter block larger in the dimension transverse to the common axis than that of the corresponding die, in order that the blocks may remain in contact with the dies throughout each cutting operation. The radial distances of the meeting faces of the block and die are not constant, and as it is essential that all parts of the die should correspond with the configuration of a cylinder when the pattern element is being placed on the assembling table, that is, the pattern element must form a portion of a cylinder concentric with the axis of the die cylinder when the die is at its ejecting position for assembling the pattern elements, but the cutting must be done while the die is relatively in a spiral or other position such that it does not form a portion of a cylinder considered circumferentially, the shape of the cutter block must be such as to maintain contact with the die knife edges during the cutting operation, this being a matter of design according to the extent to which the die is required to be turned, that is, the shape of the cutter block where the die has to be turned through an arc of 45 degrees during its circumferential travel from the beginning of the cutting operation to the moment of ejection will not be the same as the shape of the cutter block where the die turns through an arc of 90 degrees, and so on. The cutter blocks are therefore made readily interchangeable, each block being secured to the cutting cylinder as illustrated in Figure 18 by a cheese-headed screw 39 passing through its centre of gravity and radial in relation to the machined curved inner face of the block which fits on to the cylinder, a square hole 39$^A$ being provided in the head of the screw so that it can be tightened by means of a key.

Each rotatable die head 36, which is preferably made of steel, is provided with a stem 37 adapted to enter radially (in relation to the axis of the cylinder) one of a circumferential row of holes in the periphery of the die cylinder. The number of rows of holes in the die cylinder is the same as that of the number of repetitions or partial repetitions of the pattern unit which are to be made across the finished cloth. Inside the cylinder is a set of fixed cams opposite each row of holes to actuate in succession operative members associated with each die stem in the row as the said die stems come round. Each set comprises five cams, namely a cam 38 (Figure 14) to oscillate the die head, a cam 40 (Figure 15) to reverse this oscillation, an ejector cam 41 (Figure 16) and a pair of cams, one of which is shewn at 43 (Figure 17) to operate the detent for keeping the dies in position before and after being oscillated. The cams illustrated are suitable for use where the dies are to be turned through any angle and back again; the contour of the end of the die head will however require to be modified where oscillations of greater or less amplitude than 45 degrees are required.

The die 44, (Figures 4, 7 and 8) which may conveniently be made of brass, is fitted on to the die head 36 as seen in Figure 4, and secured by two or other number of bolts 45 (Figure 13) and 46 (Figure 4) having segmental heads located in an undercut annular groove 47 (Figure 9) in the die head, nuts 48, 49 engaging the said bolts, and being rotatable by means of a key. These nuts rotate freely in the recesses 48$^a$, 49$^a$ in the die 44 and pass through holes 48$^b$ and 49$^b$ in the ejector plate (Figures 6, 7 and 8). Thus the dies can be exchanged while the stems remain in the machine. The die is provided with knives 50 secured by clamps 51, and bent springs 52 (Figure 4) may be provided outside the knives to support the ribbon of material on the die when encountering the usual waste material remover, these springs giving way at the moment of cutting. A perforated ejector plate 53 (Figures 5 and 6) is resiliently secured by screws 54, 55 (Figures 7 and 8) passing freely through the die and surrounded by springs in compression 56, 57 bearing against the back of the die, the spring 56 being weaker than the spring 57 so that ejection of the pattern element begins at its leading end. On the face of the die are a number of projections 58, each projection having one or more small pins 60 which pass through the perforations in the plate 53 and enter the pattern element in order to hold it in place and prevent its buckling while the cylinder is rotating. Four of such pins may be on each of the said projections 58. A rod or plunger 61 (Figure 4), which may be called the inlaying rod, bears against the inside of the plate 53, registering in a depression 64 therein (Figure 8), and when actuated by the cam 41 (Figure 16) presses out the said plate 53 against the resistance of the springs 56, 57 so as to eject the pattern element from the die; this rod 61 is preferably divided, having a rear portion 62 separated from its front portion 61 by a spring 63 in order that its action may be soft.

A detent ring 65 which is held fast in the cylinder 34 is held against the inner side of the die head 36 by a thrust ring 66, which fits into a groove in the stem 37, this thrust ring being conveniently made in two halves secured together by a wire 67 entering a circumferential groove 68 formed in the thrust ring. In this detent ring 65 are two notches or openings 70, 71 (Figure 10) in either of which can work a detent pin 72 having a chamfered nose or inner end engaging a cup 73. This cup is normally held in the position shown in Figure 4 by a spring 74 abutting against the inside of the die. A detent tappet 75 surrounds the inlaying rod and works within the stem 37. When this tappet 75 is lifted by the pair of cams 43 (Figure 17) the cup 73 is lifted, compressing the spring 74, and the detent pin 72 can be pressed in so that its chamfered nose comes below the cup 73, this inward movement being effected by the wedge action of the sides of one of the notches 70, 71, so that the stem 37 and the die 44 are free to rotate relatively to the detent ring, while the thrust ring prevents radial movement of the stem relatively to the cylinder.

At the foot of the stem 37 is formed a cam 76 which in the rotation of the cylinder 34 successively engages the cams 38 and 40 after the tappet has released the detent, which cams respectively cause oscillation of the stem and die on their way from the cutting position to the inlaying position, and reverse oscillation on the return strokes. The shape of this cam 76, which is more clearly shown in Figure 9, is as here illustrated suitable for causing a rotary movement of the die to the extent of 45 degrees. The design of modified shapes of cams such as 76 suitable for causing a greater or smaller angular movement will present no difficulty to a machine maker.

A waste roller 77 rotating at the same surface speed as the die cylinder combs off the waste material and discharges it on to an endless band 109, this band carrying the waste material to a conveyor trough 110, whence it can be returned to the calenders.

The assembling table F is composed of jointed sections hinged parallel to the axes of the die cylinders, and traveling at the correct speed to receive from the die cylinders the cut pieces of material to be assembled in pattern formation; these sections are connected together into an endless formation with the assembling surface outside, and by means of guiding wheels (G, H) at each end of its path and supporting rollers suitably placed is caused to present to the die cylinders an uninterrupted surface moving at a speed constantly synchronizing with that of their rotation. This surface is made slightly adhesive by the application of some suitable compound, or by small pins projecting from its surface, so as to prevent accidental displacement of the pattern elements while travelling thereon.

After passing the roller K where the cloth is subjected to heat and mechanical pressure in the usual manner, and the carrier roller 103, it passes around a supplementary heated or other hollow roller 80, and two air cushions 81 and 82 compressed by adjustable screws and rollers, of which there are in all eight screws and four rollers, that is, four screws at each side of the machine, two of these being indicated by the numerals 83 and 84, which give the finished cloth a further pressure against the roller 80.

What we claim and desire to secure by Letters Patent of the United States is:—

1. In apparatus for the manufacture of inlaid floor cloths by the continuous process, means for feeding a strip of pattern material, means for cutting out pattern elements from the said strip, automatic means for partially rotating said pattern elements about their own axes after being cut, means for feeding a backing, and means for automatically assembling said pattern elements on said backing.

2. In apparatus for the manufacture of inlaid floor cloths by the continuous process, means for supplying sheets of grained pattern material having the grain thereon lying in an approximately longitudinal direction, means for dividing said sheets into relatively narrow ribbons, means for cutting out pattern elements from said ribbons, automatic means for partially rotating said pattern elements after being cut to alter the direction of the grain thereon, means for feeding a backing, and means for automatically assembling said pattern elements on said backing.

3. In apparatus for the manufacture of inlaid floor cloths by the continuous process, means for supplying sheets of grained pattern material having the grain thereon lying in an approximately longitudinal direction, means for dividing said sheets into relatively narrow ribbons, means for cutting out pattern elements from said ribbons, automatic means for partially rotating said pattern elements after being cut, a travelling assembly table, means for laying said partially rotated pattern elements on said table, means for feeding a backing over said elements, and means for consolidating said elements on said backing.

4. In apparatus for the manufacture of inlaid floor cloths by the continuous process, a cutting die having a stem placed radially in relation to the axis of a rotary cylinder, means for feeding a strip of pattern material to said die, means for imparting a movement of partial rotation to said die after cutting a pattern element from said strip, means for ejecting said pattern element from said die, and means for reversing said rotary movement of said die on its return to the cutting position.

5. In apparatus for the manufacture of inlaid floor cloths by the continuous process, a rotary die cylinder provided with cutting dies, means for feeding a strip of pattern material to said die cylinder to be cut by said dies into pattern elements, and means for oscillating each of said dies about its own axis to discharge said pattern elements as portions of a cylindrical surface.

6. In apparatus for the manufacture of inlaid floor cloths by the continuous process, a rotary die cylinder provided with knife edged oscillating dies, means for oscillating each of said dies about its own axis, a rotary cutter cylinder provided with cutting blocks, said blocks being adapted to move in contact with the knife edges of said dies while said knife edges are not concentric with the surface of the die cylinder, and means for feeding a strip of pattern material continuously between said cylinders.

7. In apparatus for the manufacture of inlaid floor cloths by the continuous process, a rotary die cylinder provided with knife edged oscillating dies, means for oscillating each of said dies about its own axis, a rotary cutter cylinder provided with readily interchangeable cutting blocks, said blocks being adapted to move in contact with the knife edges of said dies while said knife edges are not concentric with the surface of the die cylinder, and means for feeding a strip of pattern material continuously between said cylinders.

8. In apparatus for the manufacture of inlaid floor cloths by the continuous process, a rotary die cylinder provided with knife edged oscillating dies, means for oscillating each of said dies about its own axis, a rotary cutter cylinder provided with cutting blocks, said cutter cylinder rotating at a higher surface speed than said die cylinder, said blocks being adapted to move in contact with the knife edges of said dies while said knife edges are not concentric with the surface of the die cylinder, and means for feeding a strip of pattern material continuously between said cylinders.

9. In apparatus for the manufacture of inlaid floor cloths by the continuous process, a cutting die having a stem placed radially in relation to the axis of a rotary cylinder, means for feeding a strip of pattern material to said die, means for oscillating said die about its own axis, an ejector plate movable in relation to said die, springs of different strengths opposite each end of said die to resist outward movement of said ejector plate, a plunger engaging said ejector plate, and a cam inside said cylinder to actuate said plunger.

10. In apparatus for the manufacture of inlaid floor cloths by the continuous process, a rotary die cylinder provided internally with fixed cams, a cutting die having a hollow stem radially arranged in relation to said cylinder, said stem being rotatable in said cylinder but restrained from axial movement, a detent ring on said stem provided with two wedge-shaped openings, a detent pin movable in said detent ring, a spring-pressed detent tappet working through said stem and normally holding said pin and ring in engagement to prevent rotation thereof, said detent tappet ring being operable by said cams to release said engagement and permit said rotation, and means for feeding a strip of pattern material to said die.

11. In apparatus for the manufacture of inlaid floor cloths by the continuous process, a rotary die cylinder provided internally with a fixed cam, a cutting die having a stem radially arranged in relation to said cylinder, said stem being rotatable in said cylinder but restrained from axial movement, the inner end of said stem being provided with a cam surface adapted to co-act with said fixed cam to oscillate said die as the said cylinder rotates, and means for feeding a strip of pattern material to said cylinder to be cut by said die.

12. In apparatus for the manufacture of inlaid floor cloths by the continuous process, a rotary die cylinder having a plurality of circumferentially parallel rows of holes, cutting dies having stems carried on said cylinder and adapted to oscillate in said holes, means for feeding a travelling strip of pattern material to the dies in each row, a plurality of sets of cams fixed inside said cylinder, each of said sets being located opposite one of the said rows of holes and adapted to engage the die stems in the said row to effect the oscillation of said dies successively as the cylinder rotates.

13. In apparatus for the manufacture of inlaid floor cloths by the continuous process, means for feeding a plurality of parallel strips of pattern material, a rotary die cylinder carrying a parallel row of oscillating dies provided with knife edges, and a rotary cutter cylinder carrying a parallel row of cutter blocks adapted to co-operate with said dies to cut pattern elements from said parallel strips.

14. In apparatus for the manufacture of inlaid floor cloths by the continuous process, means for feeding a plurality of parallel strips of pattern material, a rotary die cylinder carrying parallel rows of oscillating dies provided with knife edges, means for oscillating each of said dies about its own axis and a rotary cutter cylinder carrying parallel rows of cutter blocks adapted to co-operate with said dies to cut pattern elements from said parallel strips, each of said cutter blocks being larger and moving at a greater surface speed than its co-operating die.

15. In apparatus for the manufacture of inlaid floor cloths by the continuous process, an oscillatory feeding trough, means for supplying said trough with a continuous strip of pattern material entering said trough at a uniform rate of speed, cutting mechanism to act intermittently on said strip, a spring-pressed brake to control the passage of said strip from said trough to said cutting mechanism, and means on said trough to release said brake intermittently.

16. In apparatus for the manufacture of inlaid floor cloths by the continuous process, an inclined feeding trough, means for supplying said trough with a continuous strip of pattern material entering said trough at a uniform rate of speed, cutting mechanism to act intermittently on said strip, and means for reciprocating said trough towards and from said cutting mechanism.

17. In apparatus for the manufacture of inlaid floor cloths by the continuous process, an inclined feeding trough, comprising two members jointed together, one of said members being carried at a constant inclination and the other member adapted to oscillate to give a variable inclination, means for supplying said trough with a continuous strip of pattern material arriving on said oscillating member at a uniform rate of speed, cutting mechanism to act intermittently on said strip, and means actuated by said oscillating member for controlling the feeding of said strip from said first-named member to said cutting mechanism.

18. In apparatus for the manufacture of inlaid floor cloths by the continuous process, an inclined feeding trough comprising two members jointed together, one of said members being carried at a constant inclination and the other member adapted to oscillate to give a variable inclination, means for supplying said trough with a continuous strip of pattern material arriving on said oscillating member at a uniform rate of speed, cutting mechanism to act intermittently on said strip, a spring brake adapted to press said strip against the bottom of said first named trough member, said brake being connected with a pivoted rocker having a tailpiece, and a nose on said oscillating member to engage said tailpiece to actuate said rocker to lift said brake.

19. In apparatus for the manufacture of inlaid floor cloths by the continuous process, a bracket, a channelled bar slidable in said bracket, an inclined trough member rigidly secured on one end of said bar, a cam to slide said bar and trough member in one direction, a spring connected with said bracket and said trough member to slide said bar and trough member in the opposite direction, a second inclined trough member jointed to said rigid trough member, means for oscillating said second trough member, means for supplying a continuous strip of pattern material to said trough members, cutting mechanism to act intermittently on said strip, and a brake to control the feeding of said strip from said rigid trough member to said cutting mechanism.

20. In apparatus for the manufacture of inlaid floor cloths by the continuous process, a bracket, a channelled bar slidable in said bracket, an inclined trough member rigidly secured on one end of said bar, a cam to slide said bar and trough member in one direction, a spring connected with said bracket and said trough member to slide said bar and trough member in the opposite direction, a stop pin secured on said bar, an adjustable stop plate on said bracket to engage said pin to limit the stroke of said bar, a second inclined trough member jointed to said rigid trough member, means for oscillating said second trough member, means for supplying a continuous strip of pattern material to said trough members, cutting mechanism to act intermittently on said strip, and a brake to control the feeding of said strip from said rigid trough member to said cutting mechanism.

21. In apparatus for the manufacture of inlaid floor cloths by the continuous process, a bracket, a channelled bar slidable in said bracket, an inclined trough member rigidly secured on one end of said bar, a cam to slide said bar and trough member in one direction, a spring connected with said bracket and said trough member to slide said bar and trough member in the opposite direction, a second inclined trough member jointed to said rigid trough member, and provided with a projection entering the channel in said bar, a second bar slidable in said channel and provided with a wedge-shaped end to engage said projection to lift said jointed trough member, a cam to slide said second bar to engage said projection, a spring to withdraw said second bar from such engagement, means for supplying a continuous strip of pattern material to said trough members, cutting mechanism to act intermittently on said strip, and a brake to control the feeding of said strip from said rigid trough member to said cutting mechanism.

22. In apparatus for the manufacture of inlaid floor cloths by the continuous process, a bracket, a channelled bar slidable in said bracket, an inclined trough member rigidly secured on one end of said bar, a cam to slide said bar and trough member in one direction, a spring connected with said bracket and said trough member to slide said bar and trough member in the opposite direction, a second inclined trough member jointed to said rigid trough member and provided with a projection entering the channel in said bar, a second bar slidable in said channel and provided with a wedge-shaped end to engage said projection to lift said jointed trough member, said second bar being adjustable in length to time said engagement, a cam to slide said second bar to engage said projection, a spring to withdraw said second bar from such engagement, means for supplying a continuous strip of pattern material to said trough members, cutting mechanism to act intermittently on said strip, and a brake to control the feeding of said strip from said rigid trough member to said cutting mechanism.

23. In apparatus for the manufacture of inlaid floor cloths by the continuous process, means for feeding a continuous strip of grained pattern material, means for cutting pattern elements from said strip, means for assembling said pattern elements on a backing in such positions that the graining is in any desired direction, means for consolidating said elements and backing into a cloth, a supplementary heated roller, means for passing said cloth around said roller, air cushions arranged to press said cloth against said roller, and adjustable screws and rollers to compress said air cushions against said cloth.

EDWARD BATTEN
JAMES DENNE BATTEN.